US011157784B2

(12) United States Patent
Palanisamy et al.

(10) Patent No.: US 11,157,784 B2
(45) Date of Patent: Oct. 26, 2021

(54) EXPLAINABLE LEARNING SYSTEM AND METHODS FOR AUTONOMOUS DRIVING

(71) Applicant: GM Global Technology Operations LLC, Detroit, MI (US)

(72) Inventors: Praveen Palanisamy, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 16/406,214

(22) Filed: May 8, 2019

(65) Prior Publication Data

US 2020/0356828 A1 Nov. 12, 2020

(51) Int. Cl.

| G06K 9/72 | (2006.01) |
|---|---|
| G05D 1/00 | (2006.01) |
| G06K 9/62 | (2006.01) |
| G06N 3/02 | (2006.01) |
| G06K 9/00 | (2006.01) |

(52) U.S. Cl.
CPC .......... G06K 9/726 (2013.01); G05D 1/0088 (2013.01); G06K 9/00791 (2013.01); G06K 9/6262 (2013.01); G06N 3/02 (2013.01); G05D 2201/0213 (2013.01)

(58) Field of Classification Search
CPC .... G05D 1/0088; G05D 1/024; G05D 1/0246; G05D 2201/0213; G06K 9/00791; G06K 9/6262; G06K 9/726; G06N 3/02
See application file for complete search history.

(56) References Cited

U.S. PATENT DOCUMENTS

| 8,175,333 | B2 * | 5/2012 | Eaton | G06F 15/16 382/103 |
|---|---|---|---|---|
| 10,402,687 | B2 * | 9/2019 | Anthony | G06K 9/00335 |
| 2015/0178578 | A1 * | 6/2015 | Hampiholi | G08G 1/205 348/149 |
| 2015/0213555 | A1 * | 7/2015 | Barfield, Jr. | H04W 4/48 705/4 |
| 2017/0153639 | A1 * | 6/2017 | Stein | G06K 9/00805 |
| 2017/0270374 | A1 * | 9/2017 | Myers | G06K 9/00369 |
| 2018/0011488 | A1 * | 1/2018 | Nishi | G05D 1/0221 |
| 2018/0314259 | A1 * | 11/2018 | Shami | B60W 50/14 |
| 2019/0012574 | A1 * | 1/2019 | Anthony | G05D 1/0088 |
| 2019/0088135 | A1 * | 3/2019 | Do | G08G 1/015 |
| 2019/0135300 | A1 * | 5/2019 | Gonzalez Aguirre | G06N 3/088 |

(Continued)

*Primary Examiner* — Babar Sarwar
(74) *Attorney, Agent, or Firm* — Cantor Colburn LLP

(57) ABSTRACT

System and method for explaining driving behavior actions of autonomous vehicles. Combined sensor information collected at a scene understanding module is used to produce a state representation. The state representation includes predetermined types of image representations that, along with a state prediction, are used by a decision making module for determining one or more weighted behavior policies. A driving behavior action is selected and performed based on the determined one or more behavior policies. Information is then provided indicating why the selected driving behavior action was chosen in a particular driving context of the autonomous vehicle. In one or more embodiments, a user interface is configured to depict the predetermined types of image representations corresponding with the driving behavior action performed via the autonomous vehicle.

18 Claims, 8 Drawing Sheets

(56) References Cited

U.S. PATENT DOCUMENTS

| | | | |
|---|---|---|---|
| 2019/0204843 A1* | 7/2019 | Fang | G08G 1/166 |
| 2019/0265712 A1* | 8/2019 | Satzoda | B60W 40/09 |
| 2019/0283763 A1* | 9/2019 | Wang | B60R 16/023 |
| 2020/0089977 A1* | 3/2020 | Lakshmi Narayanan | G06K 9/00791 |
| 2020/0202706 A1* | 6/2020 | Chaves | G08G 1/0112 |
| 2020/0207371 A1* | 7/2020 | Dougherty | B60W 40/02 |
| 2020/0241530 A1* | 7/2020 | Caveney | G06N 5/04 |
| 2020/0241545 A1* | 7/2020 | Anthony | B60W 60/00276 |
| 2020/0247432 A1* | 8/2020 | Misra | B60W 60/0015 |
| 2020/0336541 A1* | 10/2020 | Alizadeh | H04W 4/38 |

\* cited by examiner

EXPLAINABLE LEARNING SYSTEM AND METHODS FOR AUTONOMOUS DRIVING

INTRODUCTION

The invention relates generally to autonomous vehicles and, more particularly, to providing the ability to explain prior decisions and behavior actions of an autonomous vehicle regardless of the number and type of sensor modes.

There are different levels of autonomous driving based on the amount of automation. Some vehicles include significant levels of automation or are completely automated. Also, these vehicles include many different types of sophisticated sensors and data processing methods (e.g., learning algorithms) in order to obtain the automation. As a result of the increased number and type of sensors, data processing methods and the increased sophistication of these autonomous vehicles, it has become increasing difficult to easily explain the decisions and resulting behavior actions made by the autonomous vehicles. Accordingly, it is desirable to provide an easily explainable learning system for an autonomous vehicle regardless of the number and types of sensor modes and data processing methods included in the autonomous vehicle.

SUMMARY

Systems and methods are provided for explaining behavior actions of an autonomous vehicle. In an exemplary embodiment, a method for explaining driving behavior actions of an autonomous vehicle is provided. The method includes combining information collected from a plurality of information sources of the autonomous vehicle at a scene understanding module of the autonomous vehicle and producing a state representation from the combined sensor information. Note that the state representation includes predetermined types of image representations. The method also includes producing a state prediction based on the state representation and providing the state representation and the state prediction to a decision making module and determining one or more weighted behavior policies based on the predetermined types of image representations of the state representation. The method also include selecting a driving behavior action for the autonomous vehicle based on the determined one or more weighted behavior policies, performing, via the autonomous vehicle, the selected driving behavior action, and providing information indicating why the driving behavior action was selected in a particular driving context of the autonomous vehicle.

In another exemplary embodiment, the method may further include providing a user interface configured to depict the predetermined types of image representations. The selected driving behavior action can be performed via the autonomous vehicle corresponds with the predetermined types of image representations.

In another exemplary embodiment, the method may further include providing, by the user interface, a weight of a driving behavior policy associated with the selected driving behavior action.

In another exemplary embodiment, the method may further include modifying the plurality of information sources and subsequently continuing to provide the user interface configured to depict the same predetermined types of image representations corresponding with a subsequent driving behavior action performed by the autonomous vehicle despite the plurality of information sources having been previously modified.

In another exemplary embodiment, the modifying of the plurality of information sources can include at least one of modifying a number of the information sources of the plurality of information sources and modifying a type of an information source of the plurality of information sources.

In another exemplary embodiment, the predetermined types of image representations can include the following a semantic scene representation, an instances scene representation, and a depth and flow scene representation.

In another exemplary embodiment, the determining of the one or more behavior policies based on the predetermined types of image representations of the state representation can include utilizing a meta-learning model for determining the one or more behavior policies based on the predetermined types of image representations of the state representation.

In another exemplary embodiment, the method may further include selecting a set of past driving behavior actions performed by the autonomous vehicle and displaying the set of past driving behavior actions via a user interface. Note that each of the past driving behavior actions can correspond with stored image representations of the predetermined types.

In another exemplary embodiment, the method may further include selecting from the user interface one of the past driving behavior actions performed via the autonomous vehicle and, in response, displaying the predetermined types of image representations corresponding with the selected past driving behavior action.

In another exemplary embodiment, the state representation can be produced prior to determining the one or more behavior policies based on the predetermined types of image representations of that state representation.

In another exemplary embodiment, a deep neural network (DNN) of the scene understanding module can be utilized to produce the state representation from the combined sensor information.

Systems and methods are provided for explaining behavior actions of an autonomous vehicle. In an exemplary embodiment, a system for explaining driving behavior actions of an autonomous vehicle is provided. The system includes a plurality of information sources of the autonomous vehicle. The information collected from the plurality of information sources can be combined. The system includes a scene understanding module of the autonomous vehicle that receives the combined sensor information collected from the plurality of information sources of the autonomous vehicle and a state representation produced by the scene understanding module from the combined sensor information. Note that the state representation can include predetermined types of image representations. The system includes a state prediction produced by the scene understanding module based on the state representation and a decision making module that selects one or more weighted behavior policies based on the state prediction and the predetermined types of image representations of the state representation. The system includes a control module executing one or more of the driving behavior actions and information indicating why the driving behavior actions were selected in a particular driving context of the autonomous vehicle.

In another exemplary embodiment, the system may further include a user interface configured to depict the predetermined types of image representations and a weight of a driving behavior policy corresponding with the one or more of the driving behavior actions.

In another exemplary embodiment, the plurality of information sources can be modified and the user interface can continue to depict the predetermined types of image representations corresponding with a subsequent driving behavior action executed by the control module despite the plurality of information sources having been modified.

In another exemplary embodiment, the user interface displays a set of past driving behavior actions can be performed by the autonomous vehicle. Note that each of the past driving behavior actions can correspond with stored image representations of the predetermined types of image representations.

In another exemplary embodiment, the set of past driving behavior actions performed by the autonomous vehicle are selectable in order to display the predetermined types of image representations corresponding with a selected past driving behavior action.

In another exemplary embodiment, a number of information sources of the plurality of information sources can be modified.

In another exemplary embodiment, a type of an information source of the plurality of information sources can be modified.

In another exemplary embodiment, the predetermined types of image representations can include a semantic scene representation, an instances scene representation, and a depth and flow scene representation.

Systems and methods are provided for explaining behavior actions of an autonomous vehicle. In an exemplary embodiment, a method for explaining driving behavior actions of an autonomous vehicle. The method includes combining information collected from a plurality of information sources of the autonomous vehicle at a scene understanding module of the autonomous vehicle and utilizing a deep neural network (DNN) of the scene understanding module to produce a state representation from the combined sensor information. Note that the state representation can include predetermined types of image representations including a semantic scene representation, an instances scene representation, and a depth and flow scene representation. The method can further include producing a state prediction based on the state representation, providing the state representation and the state prediction to a decision making module and utilizing meta-learning for determining one or more weighted behavior policies based on the predetermined types of image representations, and selecting a driving behavior action for the autonomous vehicle based on the determined one or more weighted behavior policies. The method can further include performing, via the autonomous vehicle, the driving behavior action, and providing a user interface indicating why the driving behavior action had been selected in a particular driving context of the autonomous vehicle, the user interface configured to depict the predetermined types of image representations and the selected driving behavior action. Note that the driving behavior action can be performed via the autonomous vehicle corresponds with the predetermined types of image representations. The method can further include modifying the plurality of information sources and subsequently continuing to provide the user interface configured to depict the same predetermined types of image representations corresponding with a subsequent driving behavior action performed by the autonomous vehicle despite the plurality of information sources having been previously modified, and maintaining a record of driving behavior actions performed via the autonomous vehicle. Note that the record of driving behavior actions can be accessible via the user interface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
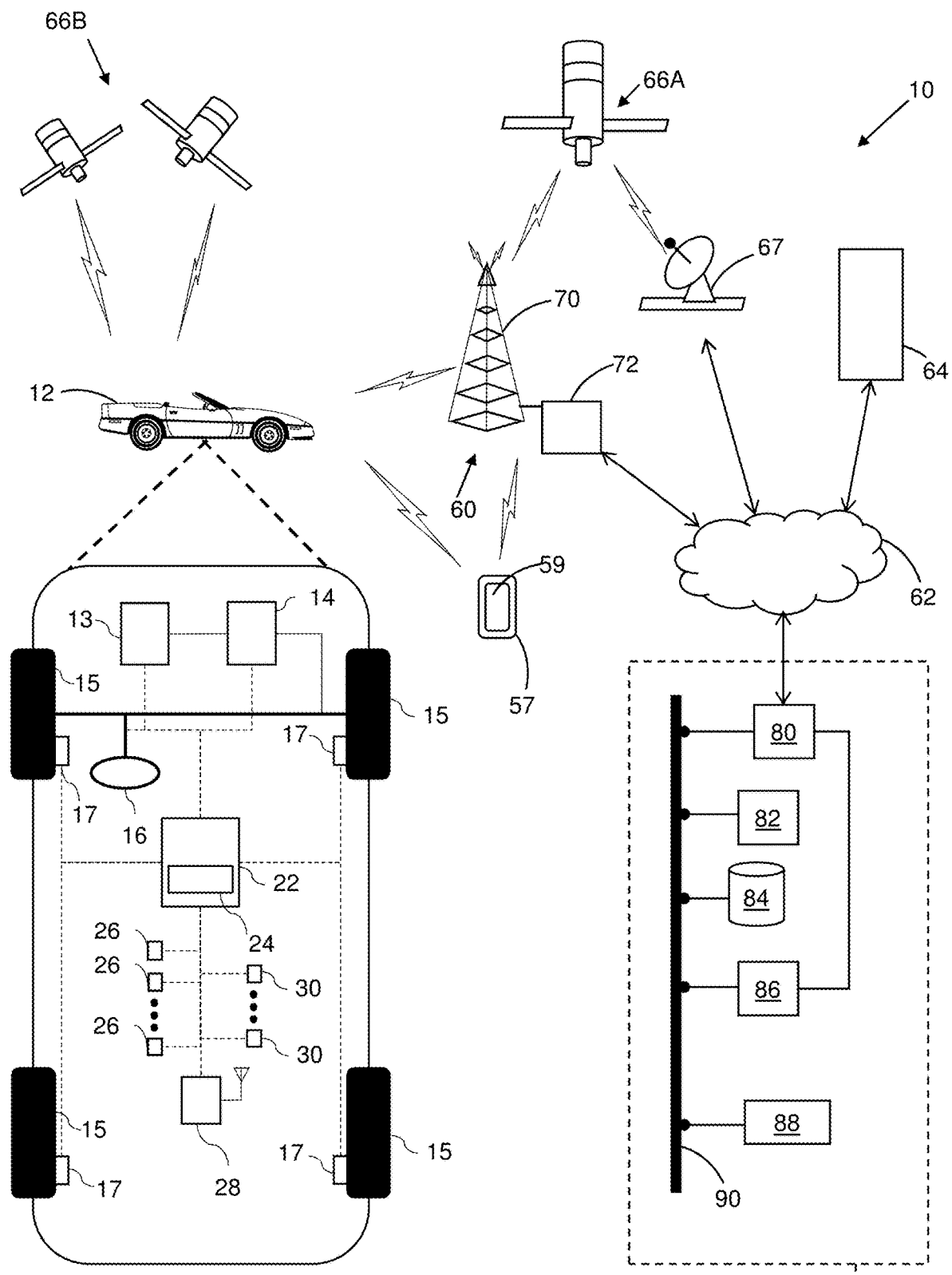
FIG. 1 shows an operating environment that includes a vehicle communication and control system for an autonomous vehicle according to one or more exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU), field programmable gate array (FPGA), application specific integrated circuit (ASIC) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, gated cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66A and an uplink transmitting station 67. Uni-directional communication can include, for example, satellite radio services, wherein programming content (news, music, etc.) is received by the transmitting station 67, packaged for upload, and then sent to the satellite 66A, which broadcasts the programming to subscribers. Bi-directional communication can include, for example, satellite telephony services using the satellite 66A to relay telephone communications between the vehicle 12 and the station 67. The satellite telephony can be utilized either in addition to or in lieu of the wireless carrier system 60. Alternatively, uni-directional or bi-directional communications could be provided via one or more satellites 66B directly with the vehicle 12.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
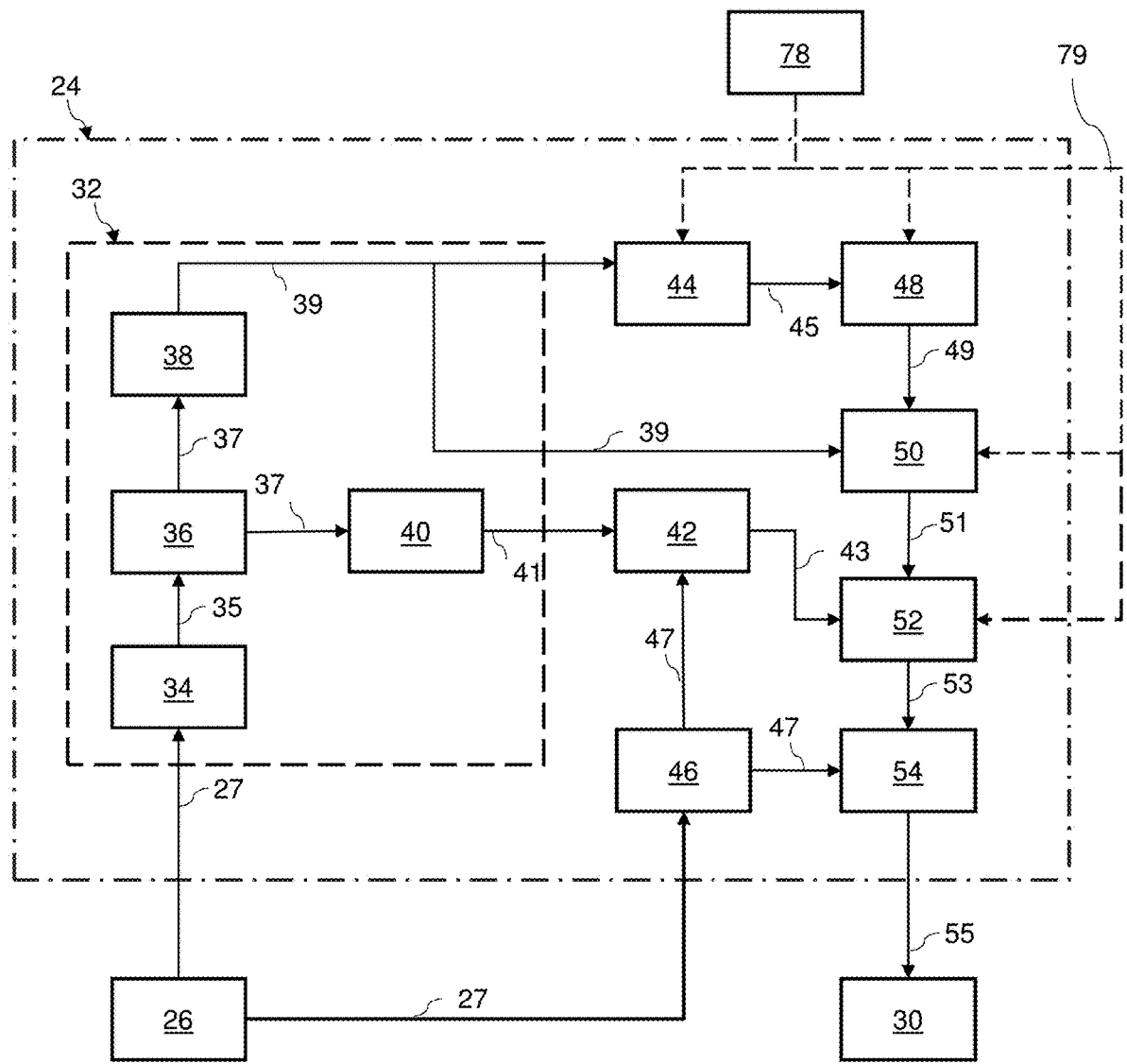
FIG. 2 shows an automated driving system (ADS) including multiple distinct control systems for determining the presence, location, classification, and path of detected features or objects in the vicinity of the vehicle according to an exemplary embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 or information from the variety of sensors 26. The sensor fusion and preprocessing module 34 performs calibration of the sensor data 27 or information, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation module 36 include, but are not limited to, freespace detection and high level tracking that fuses data from RADAR tracks, LIDAR point cloud, LIDAR segmentation, LIDAR classification, image classification, image pixels, heat maps, object shape fit models, semantic information, motion prediction, raster maps, static obstacle maps, vehicle trails, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters.

In some embodiments, once a map is built, vehicle localization is achieved in real-time via a particle filter. Particle filters, unlike Bayes or Kalman filters, better accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry output 47 and generates a vehicle location output 43 that is used in separate calculations as discussed herein.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle.

The ADS 24 also includes an observation module 44 and an interpretation module 48. The observation module 44 generates an observation output 45 that is received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

The disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
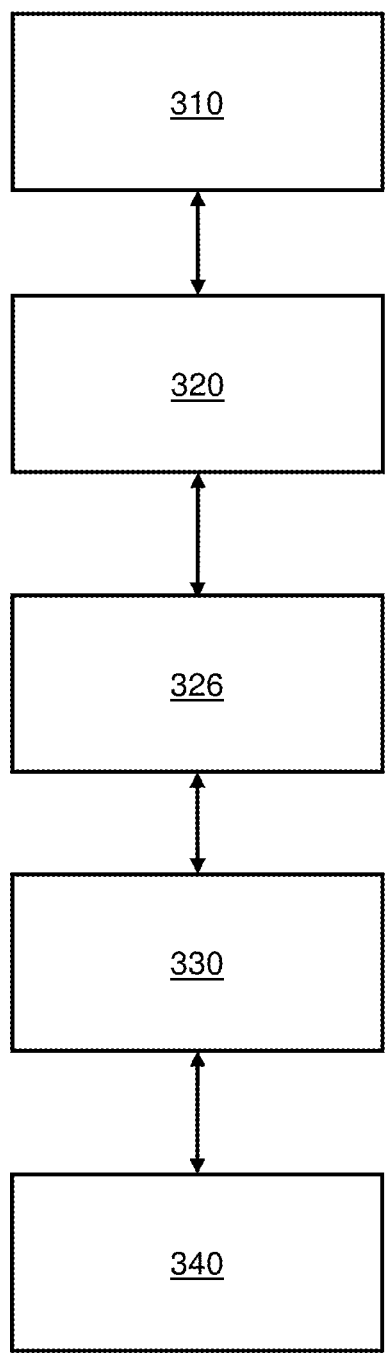
FIG. 3 shows an exemplary block diagram illustrating an exemplary implementation of a system for explaining driving behavior actions of an autonomous vehicle according to one or more exemplary embodiments.

In one or more exemplary embodiments, FIG. 3 illustrates an exemplary implementation of a system for explaining driving behavior actions of an autonomous vehicle according to one or more exemplary embodiments. FIG. 3 depicts process blocks 310, 320, 326, 330 and 340 which communicate bidirectionally between each other. Although five process blocks are shown, which are described in greater detail herein, the system may include any number of process blocks for implementing the exemplary embodiments. Process block 310 depicts information sources on-board the autonomous vehicle 12. Information from the information sources is collected and combined or fused at a scene understanding module depicted by process block 320. In one or more embodiments, the information sources correspond with the sensors 26 depicted in FIG. 1. The sensors 26 sense observable conditions of the exterior environment and/or the interior environment of the autonomous vehicle 12. The sensors 26 are also configured to provide the sensor data 27 which may be simply referred to as sensor information or just information. The sensors 26 can include, but are not limited to, radars, lidars, optical cameras, thermal cameras, imager sensors, ultrasonic sensors, inertial measurement units, global positioning systems, navigation systems, and/or other sensors. In one or more embodiments, the sensors 26 may be, for example, a camera such as an RGB (red, green, blue) camera sensitive to red, green, and blue bands of light. The sensors 26 may also include a light detection and ranging (LIDAR) sensor and a radio and detection and ranging (RADAR) sensor.

Figure 4:
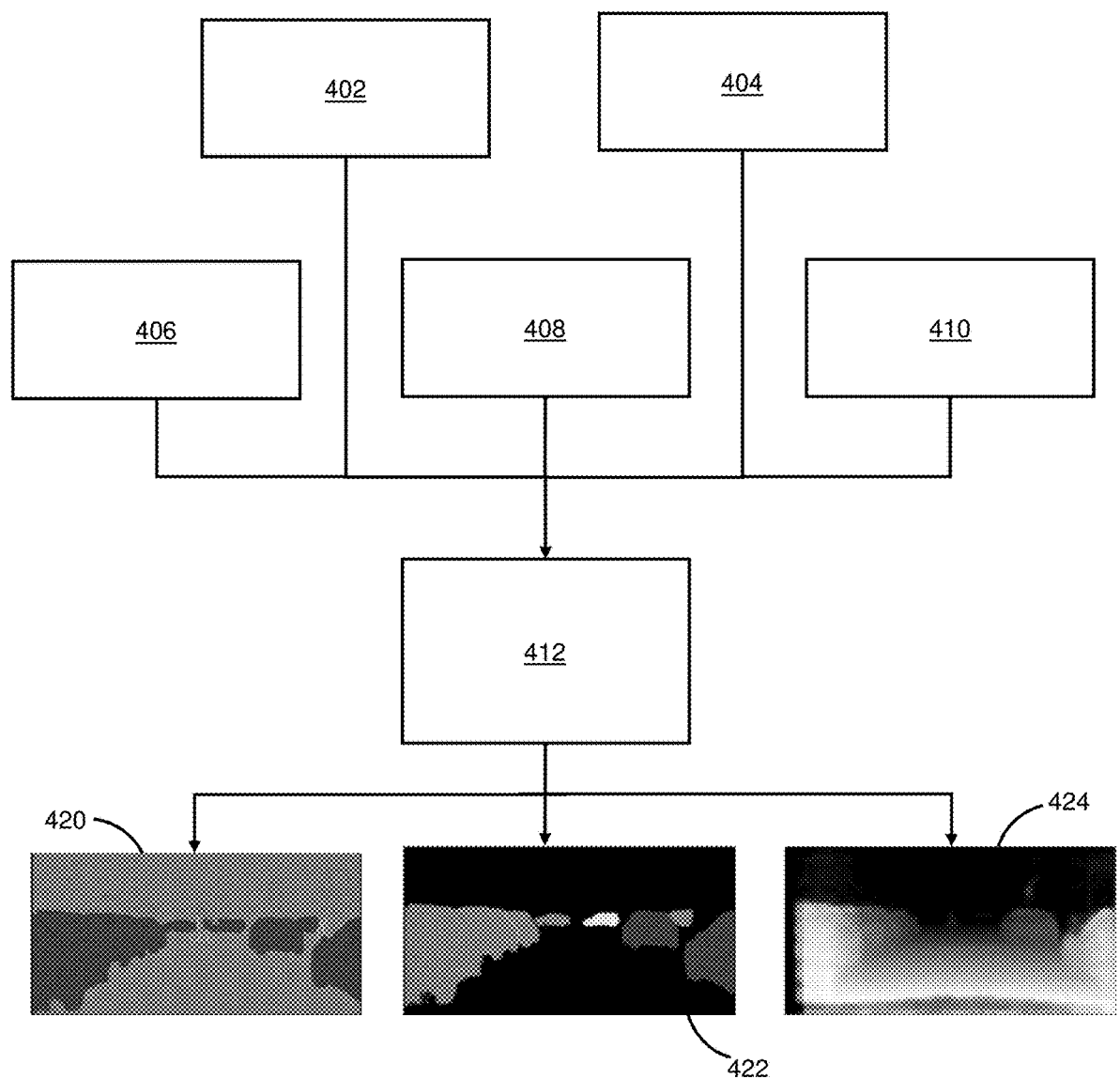
FIG. 4. shows an exemplary block diagram illustrating a more detailed exemplary implementation of the sensing and scene understanding block of FIG. 3 and the resulting predetermined types of image representations according to one or more exemplary embodiments.

FIG. 4 illustrates a camera sensor 406, a LIDAR sensor 408 and a RADAR sensor 410 providing sensor information to the scene understanding module 412. However, any number of sensors 26 and other types of sensors 26 are also contemplated. The sensors 26 may sometimes be referred to as being modular in that sensors 26 may be added or eliminated to the autonomous vehicle 12. Also, the plurality of sensors 26 are modular in that the types of sensors included on-board the autonomous vehicle 12 may be changed. As shown in FIG. 4, the scene understanding module 412 may also utilize information from original equipment manufacturers (OEMs) 402 via a cloud network such as the Internet for performing localization. Information from one or more map providers 404 may also be utilized by the scene understanding module 412.

Referring now to FIGS. 3 and 4, the scene understanding module 412 utilizes a deep neural network (DNN) to perform mathematical manipulations of the combined sensor information as input to produce a state representation as output. The state representation from the combined sensor information corresponds with the real-time driving environment of the autonomous vehicle 12. The content of the state representation changes along with the real-time driving environment. The state representation can be referred to as a fixed output in that the types of image representations included as part of the state representation remains the same regardless of the modularity of the sensors 26. In other words, the number and type of sensors 26 on-board the autonomous vehicle 12 may be changed but the predetermined types of image representations will remain the same despite the modularity of the sensors 26. In one or more embodiments, the predetermined types of image representations correspond with a semantic scene representation 420, an instances scene representation 422, and a depth and flow scene representation 424, as depicted in FIG. 4. The content of each image representation changes along with the changing environment around the autonomous vehicle 12.

At process block 326, the scene understanding module 412 then produces a state prediction based on the state representation. In other words, the scene understanding modules predicts the future state of the exterior environment of the autonomous vehicle 12 from the state representation along with information collected from the sensors indicating the position and movement of, for example, other vehicles, obstacles, people, lane markings and intersection markings. Based on the current position and movement of the other vehicles, obstacles and people, assumptions can be made about their future position and movement relative the autonomous vehicle 12. The state representation and the state prediction are then provided to a planning/decision making module in process block 330 of FIG. 3. The planning/decision making module may be simply referred to as a decision making module. The decision making module determines or choses one or more weighted behavior policies to be used for controlling the autonomous vehicle 12 in block process 340. The state representation is produced prior to the decision making module determining the one or more behavior policies based on the predetermined types of image representations of that state representation and the state prediction. The decision making module utilizes the predetermined types of image representations such as the semantic scene representation 420, the instances scene representation 422, and the depth and flow scene representation 424, of the state representation to determine which behavior policies to use for controlling the autonomous vehicle 12.

In one or more embodiments, the decision making module includes one or more driving policy learning models, such as a context-aware meta-learning model, that can retrieve past driving experiences of the autonomous vehicle 12 from memory and process the past driving experiences using policy learning algorithms to improve the behavior policies and determine which one or more weighted behavior policies to use, based on the state representation from the combined sensor information, in response to the real-time driving environment of the autonomous vehicle 12. At process block 510 of FIG. 5 the context aware meta-learning model of the decision making module utilizes the semantic scene representation 420, the instances scene representation 422, and the depth and flow scene representation 424 of the state representation to determine one or more weighted driving behavior actions for the real-time driving environment of the autonomous vehicle 12.

Figure 5:
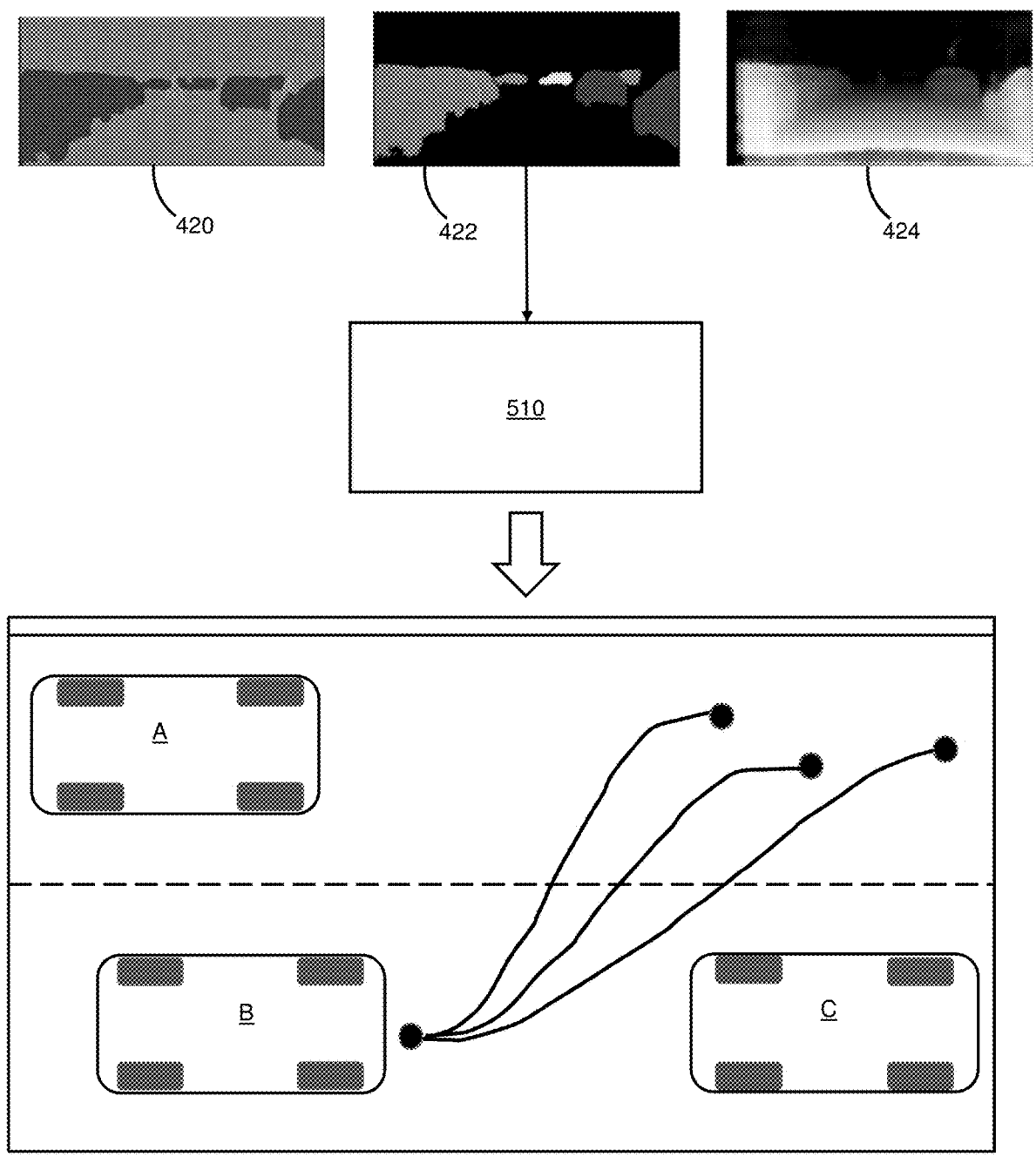
FIG. 5. shows an exemplary block diagram illustrating a more detailed exemplary implementation of the decision making module depicted in FIG. 3 utilizing the predetermined types of image representations to determine one or more weighted behavior policies for the control module of FIG. 3 according to one or more exemplary embodiments.

For example, FIG. 5 depicts vehicles A, B and C traveling in the same direction along a two-lane roadway. At least vehicle B is an autonomous vehicle. Vehicles A and C may also be autonomous vehicles but are not required to be autonomous for the purpose of explaining the autonomous driving behavior of vehicle B. Autonomous vehicle B computes possible driving behavior actions for changing from one lane to the other of the roadway. In particular, the decision making module utilizes content-aware meta-learning method/policy selection as shown in process block 510 to determine one or more behavior policies and select one or more driving behavior actions for the autonomous vehicle B. The autonomous vehicle B then performs the one or more driving behavior actions by controlling the steering, braking and throttle of the autonomous vehicle B.

Figure 6:
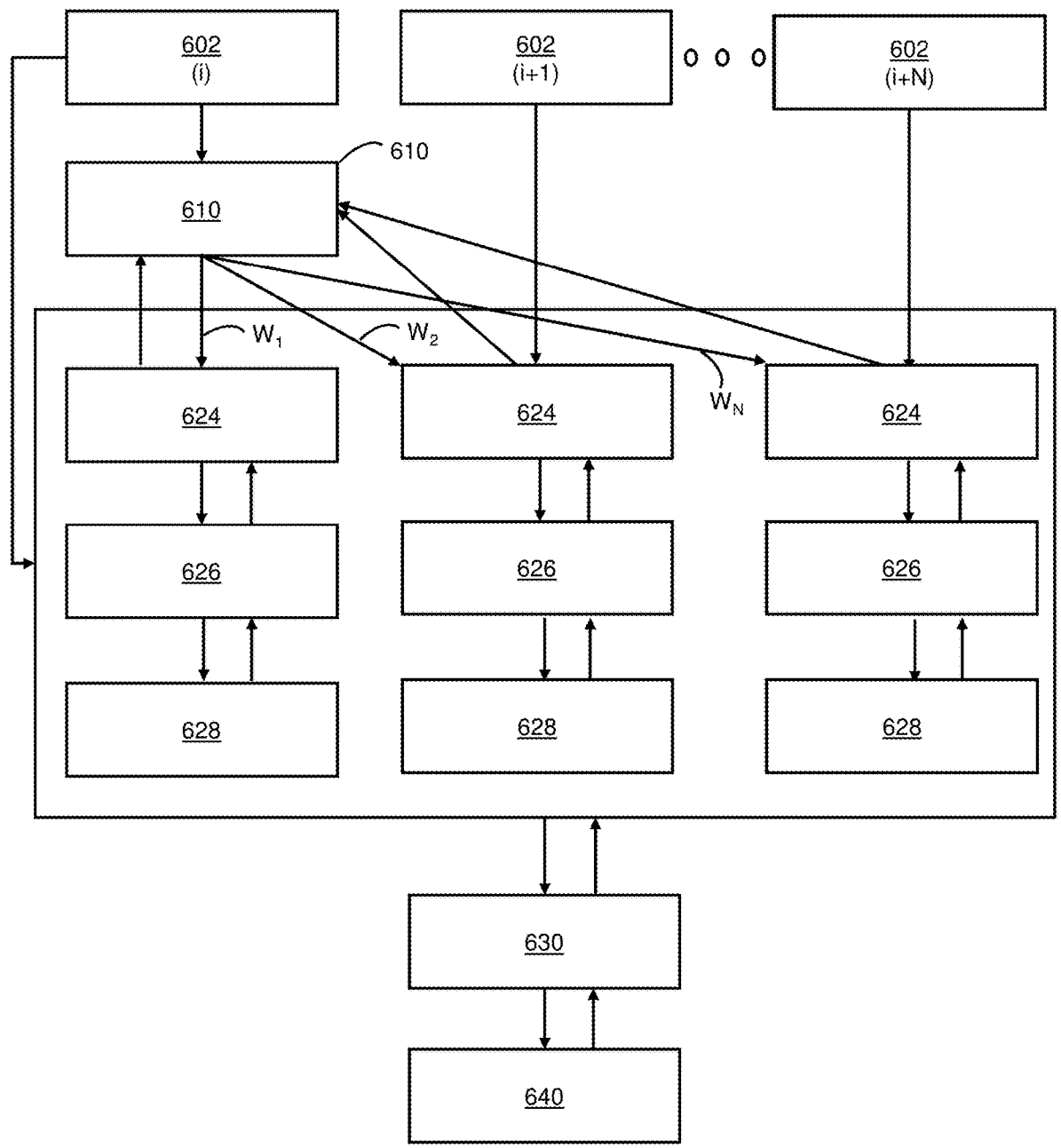
FIG. 6. illustrates the flow of an algorithm of a meta-learning model of the decision making module according to one or more exemplary embodiments.

FIG. 6. illustrates the flow of an algorithm of the meta-learning model of the decision making module according to one or more exemplary embodiments. The scene observations 602 (i through i+n) correspond with the information from the information sources provided to the scene understanding module 412. The scene observations 602 are provided to the meta-learning model 610 which learns over time through back propagation via a reinforce learning engine 620 which behavior policies are best to select based on particular scene observations. The learning engine 620 includes behavior policies 624 and corresponding behavior actions 626 which, when performed, result in intrinsic rewards 628 as shown in FIG. 6.

In order to determine which behavior policies 624 are best to select in a particular setting, reinforcement learning (RL) is used to generate a control algorithm for control of the autonomous vehicle 12 by applying deep reinforcement learning (DRL) methods to train the control algorithm that autonomously learns how to approach and traverse pathways including, for example, an urban stop-sign intersection, by collecting information surrounding vehicles and the road. Unlike rule-based algorithms, RL algorithms learn to deal with unpredictable and changeable situations based on errors and trials during the training process. Unlike supervised learning, RL does not need a large amount of labeled data to training a data-based model. The algorithm enables developing a flexible mapping function from environment states to control actions according to recorded experience, which is similar to how human drivers learn to drive.

RL can be used by an autonomous vehicle agent to learn to control the autonomous vehicle from the sensor outputs. RL also differs from supervised learning in that correct input-output pairs are not presented, but instead a machine (software agent) learns to take actions in some environment to maximize some form of intrinsic reward or minimize a cost. Taking an action moves the environment/system from one state to another. Deep reinforcement learning (DRL) refers to any number of a machine learning technique that extend a reinforcement learning approach to learning of the entire process using deep learning techniques. Deep reinforcement learning (DRL) can be used to actively target problems that interact with the environment and learn by maximizing a scalar reward signal. An agent of a Deep Reinforcement Learning (DRL) algorithm uses a neural network (e.g., a convolutional neutral network that is used to recognize an agent's state) to select the behavior action to be performed in response to receiving any given observation. Neural networks are machine learning models that employ one or more layers of nonlinear units to predict an output for a received input. A "deep neural network" is used to refer to a neural network with one or more hidden layers in addition to an output layer. The output of each hidden layer is used as input to the next layer in the network (i.e., the next hidden layer or the output layer). Each layer of the network generates an output from a received input in accordance with current values of a respective set of parameters.

To explain further, in DRL, the agent uses a deep neural network to learn the long term value of a state/action. A DRL based agent can also use a deep neural network to learn the mappings between state and actions. By performing a behavior action, the agent transitions from state to state. Executing a behavior action 624 in a specific state provides the agent with the intrinsic reward 628 such as a numerical score. The neural network uses coefficients to approximate the function relating inputs to outputs, and learns to find the right coefficients, or weights "W", by iteratively adjusting those weights along gradients that promise less error. FIG. 6 shows weights $W_1$, $W_2$ through $W_N$ corresponding with weighted behavior policies. The weights are adjusted over time for particular behavior policies 624 based on driving behavior actions 626 and rewards that occur and the feedback from the autonomous vehicle resulting from the particular behavior policies 624 that were selected. The goal of the agent is to maximize its total (future) reward. It does this by adding the maximum reward attainable from the future state to the reward in its current state, effectively influencing the current action by the potential reward in the future. The state-value is a weighted sum of the expected values of the rewards of all future steps starting from the current state.

Thus, the meta-learning model 610 is trained over time on which weighted behavior policies 624 are better to execute in particular situations. The selected behavior policy 630 describes the driving behavior action to be taken and is sent to the control module 640 of the autonomous vehicle 12 to be executed in order to control the autonomous vehicle 12. The meta-learning model 610 not only learns over time what behavior policies work best, it also learns how to explain why the autonomous vehicle 12 performed a particular driving behavior action based on a particular selected behavior action. In one or more embodiments, the explanation includes the state representation with the predetermined types of image representations corresponding with a particular scene along with representations of the weights W of the one or more behavior policies that were considered and/or selected to initiate the one or more driving behavior actions. Any such explanations are provided independent of any changes or modifications to the number or the quantity of the information sources or sensors. Thus, in order to determine which one or more weighted behavior policies 624 to be used for controlling the autonomous vehicle 12, the decision making module utilizes the meta-learning model 610 which acts as the agent of the RL learning-based behavior policies and which learns, as a result of the weights W changing over time, how to explain why the particular behavior policy, such as the behavior policy 630 was chosen in a particular driving context.

Figure 7:
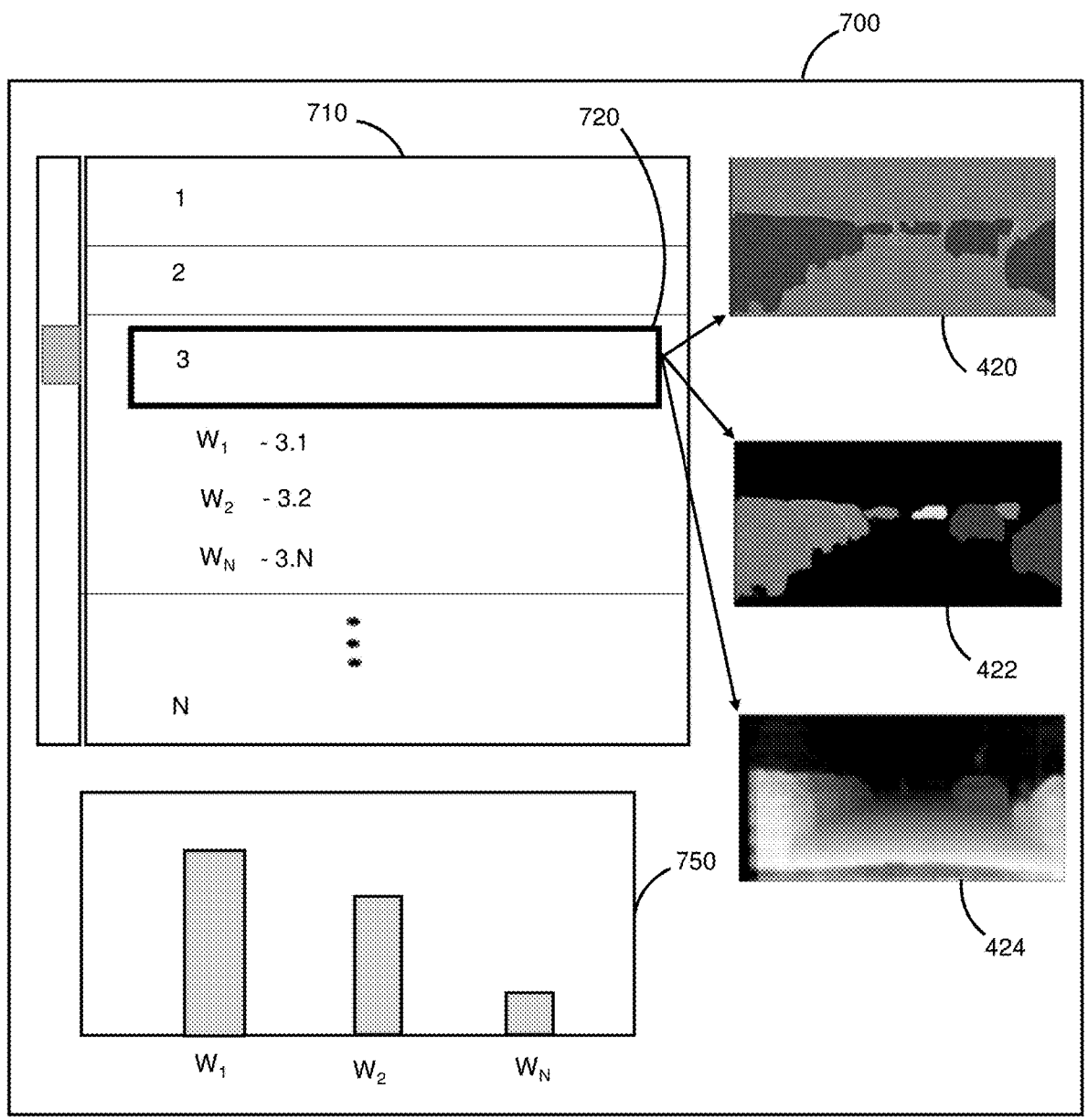
FIG. 7 illustrates an exemplary embodiment of a user interface for explaining driving behavior actions of an autonomous vehicle according to one or more exemplary embodiments.

In one or more embodiments, the information sources or sensors on the autonomous vehicle 12 may be modified. In other words, a number or the quantity of the information sources is modified. For example, a sensor may be added or be eliminated from the autonomous vehicle. Also, a type of the information sources may be modified. For example, a RGB camera sensor may be changed to a thermal camera sensor. Also, the information sources may be modified as a result of receiving feedback information from the control module, scene understanding module, or the decision making module as explained below. When modifying the plurality of information sources the user interface 700 of FIG. 7 is configured to subsequently continue to depict the same predetermined types of image representations corresponding with a subsequent driving behavior action that had been performed by the autonomous vehicle 12 despite the plurality of information sources having been previously modified. Also, the content depicted or derived from the predetermined types of image representations, at the time corresponding with the particular driving behavior action, changes as the exterior environment changes around the autonomous vehicle 12.

The control module is configured to receive feedback information from the systems of the autonomous vehicle 12 as a result of the autonomous vehicle 12 performing driving behavior actions. The feedback includes information such as, for example, the actual speed, slippage, vehicle orientation and/or direction. For example, when the decision making module sends a set of driving behavior actions or commands to the control module, the control module controls the systems of the autonomous vehicle 12 and the decision making module then receives the feedback information back from the control module. The decision making module utilizes that feedback information from the control module to adjust or modify the meta-learning model and its reinforcement-based behavior policies based on how effective the set of driving behavior actions were in view of the current context of the autonomous vehicle 12 in its particular setting. To account for the uncertainty in its predictions versus the actual execution of the set of driving behavior actions, feedback information is also sent back to the scene understanding module regarding which aspects of the state representation and which aspects of the content of the predetermined types of image representations were more useful and which were not in response to having made particular decisions and for having performed certain driving behavior actions. The scene understanding module then sends feedback information to the information sources. For example, based on the feedback information from the scene understanding module, one or more sensors may be configured or oriented to focus on particular aspects of the external environment that includes more useful information and that was helpful to the decision making module in providing the set of driving behavior actions to the control module. In one or more embodiments, the feedback information can be used to determine which type or number of sensors to activate and operate or how particular sensors are to be oriented.

FIG. 7 illustrates an exemplary embodiment of a user interface 700 generated based on information from the scene understanding module and the decision making module for implementing one or more aspects of the present invention. The user interface 700 is configured to depict the predetermined types of image representations corresponding with driving behavior actions performed via the autonomous vehicle 12. The user interface 700 also includes a set or listing 710 of past driving behavior actions of the autonomous vehicle 12. In one or more embodiments, the listing 710 of the past driving behavior actions may be a dropdown menu.

Each of the past driving behavior actions are selectable and, when a particular behavior action is selected, the user interface 700 displays one or more behavior policies and their associated weights $W_1$ through $W_N$ which correspond with a selected behavior action. One or more of the weighted behavior polices were considered as the most relevant and/or were utilized by the decision making module in order to select the particular driving behavior action. Also, the user interface displays the predetermined types of image representations corresponding with the selected driving behavior action.

For example, as shown in FIG. 7, when driving behavior action 3 is highlighted and selected, weighted behavior polices (e.g., Behavior Policy 3.1, Behavior Policy 3.2, . . . , Behavior Policy 3.N) are retrieved and shown along with stored image representations, as shown by reference number 720, corresponding in time with driving behavior action 3. When selecting a different driving behavior action, different behavior polices and image representations corresponding in time will be retrieved from storage and displayed. Regardless of the particular driving behavior action selected, the user interface 700 displays the predetermined types of images such as, for example, the semantic scene representation 420, the instances scene representation 422, and the depth and flow scene representation 424.

FIG. 7 also illustrates an exemplary embodiment of a histogram depicting a distribution of various weights W corresponding with a particular scene according to a selected behavior policy and/or available behavior policies. For example, the weights W depicted in a histogram correspond with the behavior polices considered by the decision making module at a particular time where a particular behavior action was selected by the decision making module. Thus, the weights W correspond to state representations that along with the image representations can explain why a particular reinforcement behavior policy gets chosen and that leads to a particular driving behavior action of the autonomous vehicle 12 occurring.

In one or more embodiments, a user may interact with the user interface 700 by, for example, scrolling through the past driving control actions, to display a consecutive series of state representations corresponding with driving behavior actions of the autonomous vehicle over time. In one or more embodiments, the behavior actions may be listed or arranged based on how associated behavior policies are weighted. Also, in one or more embodiments, a particular time or scene corresponding with the autonomous vehicle 12 at a particular location may be selected in order to ascertain what behavior actions were available or considered by the decision making module of the autonomous vehicle 12.

Figure 8:
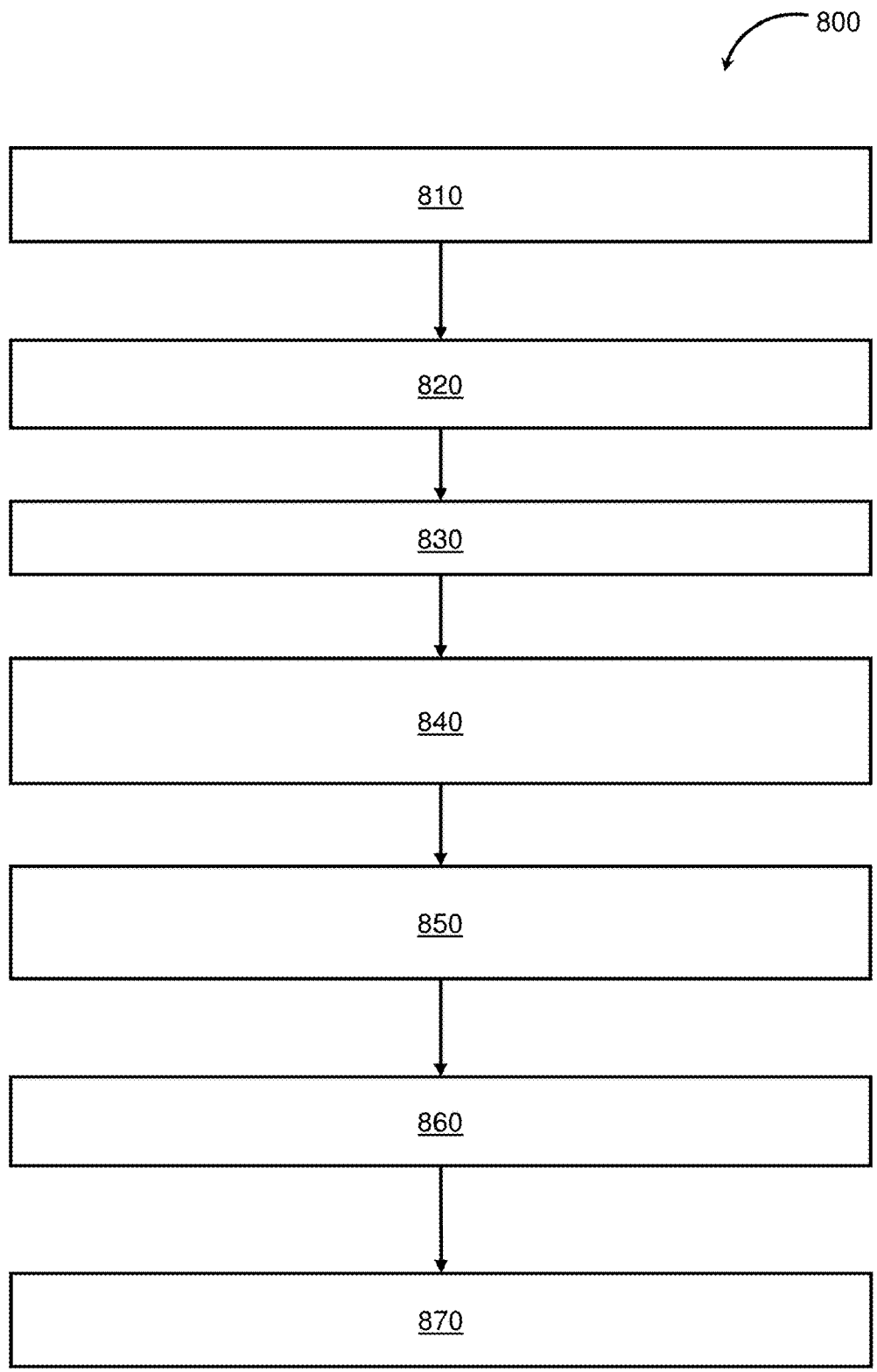
FIG. 8 shows an exemplary flow chart illustrating an exemplary implementation of a method for explaining driver behavior actions of an autonomous vehicle according to one or more exemplary embodiments.

Turning now to FIG. 8, a method 800 for explaining driving behavior actions of an autonomous vehicle is illustrated according to a non-limiting embodiment. The flow diagram of FIG. 8 illustrates the method 800 that includes process block 810 for combining sensor information collected from a plurality of information sources of the autonomous vehicle at a scene understanding module of the autonomous vehicle. The method 800 also includes process block 820 for producing a state representation from the combined sensor information, wherein the state representation includes predetermined types of image representations and process block 830 for producing a state prediction based on the state representation. The method 800 also includes process block 840 for providing the state representation to a decision making module and determining one or more behavior policies based on the predetermined types of image representations of the state representation. Also, the method 800 includes process block 850 for selecting a driving behavior action for the autonomous vehicle based on the determined one or more behavior policies and process block 860 for performing, via the autonomous vehicle, the driving behavior action. The method 800 then also includes process block 870 for providing information indicating why the driving behavior action had been selected in a particular driving context of the autonomous vehicle.

The method 800 may also include one or more other process blocks. In one or more embodiments, the method 800 can providing a user interface configured to depict the predetermined types of image representations, wherein the driving behavior action performed via the autonomous vehicle corresponds with the predetermined types of image representations. The method 800 can also include modifying the plurality of information sources and subsequently continuing to provide the user interface configured to depict the same predetermined types of image representations corresponding with a subsequent driving behavior action performed by the autonomous vehicle despite the plurality of information sources having been previously modified. Modifying the plurality information sources can include modifying a number of the information sources of the plurality of information sources and/or modifying a type of one of the information sources of the plurality of information sources. The method 800 can also include where the predetermined types of image representations include the following: a semantic scene representation, an instances scene representation, and a depth and flow scene representation. Also, the method 800 can include where the plurality of information sources are a plurality of sensors of the autonomous vehicle. The method 800 can also include where determining the one or more behavior policies based on the predetermined types of image representations of the state representation includes utilizing a meta-learning model for determining the one or more behavior policies based on the predetermined types of image representations of the state representation.

The method 800 may also include selecting a set of past driving behavior actions performed by the autonomous vehicle and displaying the set of past driving behavior actions via the user interface, wherein each of the past driving behavior actions correspond with stored image representations of the predetermined types. The method 800 may also include selecting from the user interface one of the past driving behavior actions performed via the autonomous vehicle and, in response, displaying the predetermined types of image representations corresponding with the selected past driving behavior action. Also, the method 800 may include interacting with the user interface to display a consecutive series of state representations corresponding with driving behavior actions of the autonomous vehicle over time. The method 800 may include where the state representation is produced prior to determining the one or more behavior policies based on the predetermined types of image representations of that state representation. Also, the method 800 may include where a deep neural network (DNN) of the scene understanding module is utilized to produce the state representation from the combined sensor information. The method 800 may also include maintaining a record of driving behavior actions performed via the autonomous vehicle, wherein the record of driving behavior actions is accessible via the user interface.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for explaining driving behavior actions of an autonomous vehicle, the method comprising:
   combining information collected from a plurality of information sources of the autonomous vehicle at a scene understanding module of the autonomous vehicle as combined sensor information;
   producing a state representation from the combined sensor information, wherein the state representation includes predetermined types of image representations;
   producing a state prediction based on the state representation;
   providing the state representation and the state prediction to a decision making module and determining one or more weighted behavior policies based on the predetermined types of image representations of the state representation;
   selecting a driving behavior action for the autonomous vehicle based on the determined one or more weighted behavior policies;
   performing, via the autonomous vehicle, the selected driving behavior action;
   providing information indicating why the driving behavior action was selected in a particular driving context of the autonomous vehicle; and
   providing a user interface configured to depict the predetermined types of image representations, wherein the selected driving behavior action performed via the autonomous vehicle corresponds with the predetermined types of image representations.

2. The method of claim 1, further comprising the user interface providing a weight of a driving behavior policy associated with the selected driving behavior action.

3. The method of claim 1, further comprising modifying the plurality of information sources and subsequently continuing to provide the user interface configured to depict the same predetermined types of image representations corresponding with a subsequent driving behavior action performed by the autonomous vehicle despite the plurality of information sources having been previously modified.

4. The method of claim 3, wherein modifying the plurality of information sources comprises at least one of:
   modifying a number of the information sources of the plurality of information sources; and
   modifying a type of an information source of the plurality of information sources.

5. The method of claim 1, wherein the predetermined types of image representations comprise the following:
   a semantic scene representation;
   an instances scene representation; and
   a depth and flow scene representation.

6. The method of claim 1, wherein determining the one or more weighted behavior policies based on the predetermined types of image representations of the state representation comprises utilizing a meta-learning model for determining the one or more behavior policies based on the predetermined types of image representations of the state representation.

7. The method of claim 1, further comprising selecting a set of past driving behavior actions performed by the autonomous vehicle and displaying the set of past driving behavior actions via a user interface, wherein each of the past driving behavior actions correspond with stored image representations of the predetermined types.

8. The method of claim 7, further comprising selecting from the user interface one of the past driving behavior actions performed via the autonomous vehicle and, in response, displaying the predetermined types of image representations corresponding with the selected past driving behavior action.

9. The method of claim 1, wherein the state representation is produced prior to determining the one or more weighted behavior policies based on the predetermined types of image representations of that state representation.

10. The method of claim 1, wherein a deep neural network (DNN) of the scene understanding module is utilized to produce the state representation from the combined sensor information.

11. A system for explaining driving behavior actions of an autonomous vehicle, the system comprising:
- a plurality of information sources of the autonomous vehicle, wherein information collected from the plurality of information sources is combined as combined sensor information;
- a scene understanding module of the autonomous vehicle receiving the combined sensor information collected from the plurality of information sources of the autonomous vehicle;
- a state representation produced by the scene understanding module from the combined sensor information, wherein the state representation includes predetermined types of image representations;
- a state prediction produced by the scene understanding module based on the state representation;
- a decision making module selecting one or more weighted behavior policies based on the state prediction and the predetermined types of image representations of the state representation;
- a control module executing one or more of the driving behavior actions; and
- information indicating why the driving behavior actions were selected in a particular driving context of the autonomous vehicle; and
- a user interface configured to depict the predetermined types of image representations and a weight of a driving behavior policy corresponding with the one or more of the driving behavior actions.

12. The system of claim 11, wherein the plurality of information sources is modified and the user interface continues to depict the predetermined types of image representations corresponding with a subsequent driving behavior action executed by the control module despite the plurality of information sources having been modified.

13. The system of claim 11, wherein the user interface displays a set of past driving behavior actions performed by the autonomous vehicle wherein each of the past driving behavior actions correspond with stored image representations of the predetermined types of image representations.

14. The system of claim 13, wherein the set of past driving behavior actions performed by the autonomous vehicle are selectable in order to display the predetermined types of image representations corresponding with a selected past driving behavior action.

15. The system of claim 11, wherein a number of information sources of the plurality of information sources is modified.

16. The system of claim 11, wherein a type of an information source of the plurality of information sources is modified.

17. The system of claim 11, wherein the predetermined types of image representations include a semantic scene representation, an instances scene representation, and a depth and flow scene representation.

18. A method for explaining driving behavior actions of an autonomous vehicle, the method comprising:
- combining information collected from a plurality of information sources of the autonomous vehicle at a scene understanding module of the autonomous vehicle;
- utilizing a deep neural network (DNN) of the scene understanding module to produce a state representation from the combined sensor information, wherein the state representation includes predetermined types of image representations including a semantic scene representation, an instances scene representation, and a depth and flow scene representation;
- producing a state prediction based on the state representation;
- providing the state representation and the state prediction to a decision making module and utilizing meta-learning for determining one or more weighted behavior policies based on the predetermined types of image representations;
- selecting a driving behavior action for the autonomous vehicle based on the determined one or more weighted behavior policies;
- performing, via the autonomous vehicle, the driving behavior action;
- providing a user interface indicating why the driving behavior action had been selected in a particular driving context of the autonomous vehicle, the user interface configured to depict the predetermined types of image representations and the selected driving behavior action, wherein the driving behavior action performed via the autonomous vehicle corresponds with the predetermined types of image representations;
- modifying the plurality of information sources and subsequently continuing to provide the user interface configured to depict the same predetermined types of image representations corresponding with a subsequent driving behavior action performed by the autonomous vehicle despite the plurality of information sources having been previously modified; and
- maintaining a record of driving behavior actions performed via the autonomous vehicle, wherein the record of driving behavior actions is accessible via the user interface.

* * * * *